United States Patent
Gregory et al.

(10) Patent No.: US 11,062,333 B2
(45) Date of Patent: Jul. 13, 2021

(54) DETERMINING INDICES BASED ON AREA-ASSIGNED DATA ELEMENTS

(71) Applicant: Accenture Global Solutions Limited, Dublin (IE)

(72) Inventors: Peter Gregory, St. Joseph, MO (US); Alan Nalle, Atlanta, GA (US); Geoffrey M. Hills, New York, NY (US)

(73) Assignee: Accenture Global Solutions Limited, Dublin (IE)

( * ) Notice: Subject to any disclaimer, the term of this patent is extended or adjusted under 35 U.S.C. 154(b) by 1000 days.

(21) Appl. No.: 15/358,514

(22) Filed: Nov. 22, 2016

(65) Prior Publication Data

US 2018/0144351 A1    May 24, 2018

(51) Int. Cl.
*G06Q 30/02* (2012.01)
*G06N 20/00* (2019.01)
*G06Q 10/06* (2012.01)
*G06Q 10/10* (2012.01)

(52) U.S. Cl.
CPC ......... *G06Q 30/0202* (2013.01); *G06N 20/00* (2019.01); *G06Q 10/067* (2013.01); *G06Q 10/0631* (2013.01); *G06Q 10/10* (2013.01); *G06Q 30/0205* (2013.01); *G06Q 10/0637* (2013.01)

(58) Field of Classification Search
CPC combination set(s) only.
See application file for complete search history.

(56) References Cited

U.S. PATENT DOCUMENTS

| 8,332,259 | B1 | 12/2012 | Zias et al. |
| 8,521,578 | B2 * | 8/2013 | Hummel ............ G06Q 30/0202 705/7.29 |
| 8,731,992 | B1 | 5/2014 | Anthony et al. |
| 8,972,509 | B2 | 3/2015 | Maheshwari et al. |
| 2001/0056328 | A1 * | 12/2001 | Trippel .................. G16H 40/63 702/19 |

(Continued)

OTHER PUBLICATIONS

Australian First Examination Report corresponding to AU 2017235915, dated Jan. 22, 2018, 3 pages.

(Continued)

*Primary Examiner* — Crystol Stewart
(74) *Attorney, Agent, or Firm* — Harrity & Harrity, LLP

(57) ABSTRACT

A device may receive first information that includes a first data element. The device may receive second information that includes a second data element. The first data element and the second data element may be associated with different area identifiers. The device may associate the first information and the second information with a geographic area. The device may determine, for the geographic area, a first data element score based on the first data element. The device may determine, for the geographic area, a second data element score based on the second data element. The device may determine, for the geographic area, a market index based on the first data element score and the second data element score. The device may provide information regarding the market index to permit and/or cause an action to be performed in association with the geographic area.

20 Claims, 9 Drawing Sheets

(56) References Cited

U.S. PATENT DOCUMENTS

| | | | | |
|---|---|---|---|---|
| 2002/0169657 | A1* | 11/2002 | Singh | G06Q 30/0202 705/7.31 |
| 2003/0033195 | A1* | 2/2003 | Bruce | G06Q 30/02 705/7.31 |
| 2006/0282371 | A1 | 12/2006 | Doyle et al. | |
| 2007/0112615 | A1* | 5/2007 | Maga | G06Q 30/0202 705/7.34 |
| 2007/0192347 | A1* | 8/2007 | Rossmark | G06Q 10/00 |
| 2009/0083128 | A1* | 3/2009 | Siegel | G06Q 30/02 705/7.34 |
| 2009/0248490 | A1* | 10/2009 | Moncreiff | G06Q 10/0637 705/7.34 |
| 2010/0179930 | A1* | 7/2010 | Teller | G06N 20/00 706/12 |
| 2012/0089431 | A1* | 4/2012 | Smith | G06Q 10/0631 705/7.13 |
| 2012/0095802 | A1* | 4/2012 | Wilberding | G06Q 10/063 705/7.28 |
| 2012/0290505 | A1* | 11/2012 | Eder | G06Q 30/0201 705/36 R |
| 2013/0204805 | A1 | 8/2013 | Caper | |
| 2013/0218683 | A1* | 8/2013 | Hannan | G06Q 30/0261 705/14.58 |
| 2014/0164008 | A1* | 6/2014 | Gordon | G06Q 10/06 705/2 |
| 2014/0278507 | A1* | 9/2014 | Potter | G06Q 30/0201 705/2 |
| 2015/0058029 | A1* | 2/2015 | Su | G06Q 50/22 705/2 |
| 2015/0170161 | A1* | 6/2015 | Unser | G06Q 30/0201 705/7.31 |
| 2015/0186910 | A1* | 7/2015 | Cruickshank | G06Q 30/0205 705/7.34 |
| 2015/0287051 | A1* | 10/2015 | Baig | G06Q 30/0201 705/7.29 |
| 2015/0324825 | A1* | 11/2015 | McLean | G06Q 30/0205 705/7.31 |
| 2016/0026942 | A1* | 1/2016 | Simon | G06Q 10/0631 705/2 |
| 2016/0239754 | A1* | 8/2016 | Dursun | G06N 20/00 |
| 2016/0283955 | A1* | 9/2016 | Terrazas | G06Q 30/0202 |
| 2017/0109671 | A1* | 4/2017 | Nagaraja Rao | G06Q 10/0635 |
| 2017/0235848 | A1* | 8/2017 | Van Dusen | G06F 16/904 705/12 |
| 2017/0337498 | A1* | 11/2017 | Rahimi | G06Q 10/0635 |
| 2018/0101804 | A1* | 4/2018 | Dayama | G06Q 10/20 |

OTHER PUBLICATIONS

Finviz Financial Visualizations, published on Dec. 23, 2015, as per Wayback Machine [retrieved on Mar. 9, 2020] Retrieved from the internet [URL: https://web.archive.org/web/20151223094108/https://finviz.com/map.ashx].

* cited by examiner

DETERMINING INDICES BASED ON AREA-ASSIGNED DATA ELEMENTS

BACKGROUND

An entity may conduct research to determine a potential market (e.g., an aggregate of individuals, firms, organizations, etc.) that may be interested in a product, service, or the like. An entity may identify a potential market based on various factors and data.

SUMMARY

In some possible implementations, a device may include one or more processors. The one or more processors may receive first information that includes a first data element. The first information may be associated with a first area identifier. The one or more processors may receive second information that includes a second data element. The second information may be associated with a second area identifier. The one or more processors may associate the first information and the second information with a geographic area based on the first area identifier and the second area identifier. The one or more processors may determine, for the geographic area, a first data element score based on the first data element. The one or more processors may determine, for the geographic area, a second data element score based on the second data element. The one or more processors may determine, for the geographic area, a market index based on the first data element score and the second data element score. The one or more processors may provide information regarding the market index to permit and/or cause an action to be performed in association with the geographic area.

In some possible implementations, a method may include receiving, by a device, first information that is associated with a first area identifier. The method may include receiving, by the device, second information that is associated with a second area identifier. The first area identifier may be different than the second area identifier. The method may include associating, by the device, the first information and the second information with a geographic area based on the first area identifier and the second area identifier. The method may include determining, by the device and for the geographic area, a set of data element scores based on the first information and the second information. The method may include determining, by the device and for the geographic area, a market index based on the set of data element scores. The method may include providing, by the device, information regarding the market index to cause an action to be performed in association with the geographic area.

In some possible implementations, a non-transitory computer readable medium may store instructions. The instructions may cause a processor to receive information associated with a geographic area. The information may include a first data element and a second data element. The instructions may cause the processor to receive information associated with an entity. The instructions may cause the processor to determine, based on the information associated with the entity, a first data element score associated with the first data element. The instructions may cause the processor to determine, based on the information associated with the entity, a second data element score associated with the second data element. The instructions may cause the processor to apply a first weight value to the first data element score. The instructions may cause the processor to apply a second weight value to the second data element score. The instructions may cause the processor to determine a market index, for the geographic area, based on applying the first weight value and the second weight value. The instructions may cause the processor to provide information regarding the market index to permit and/or cause an action to be performed in relation to the geographic area.

DETAILED DESCRIPTION

Figure 1A:
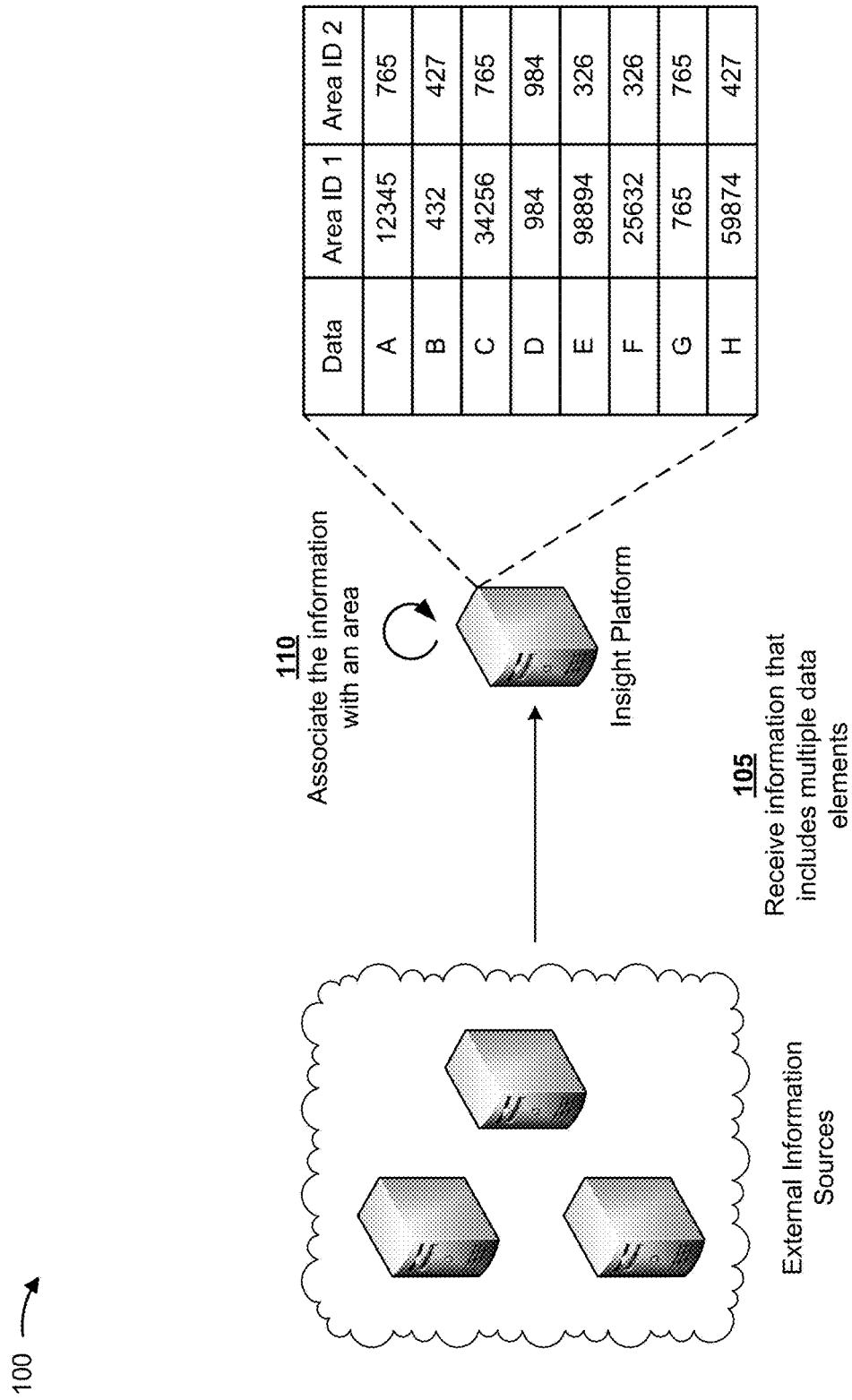
FIGS. 1A-1F are diagrams of an overview of an example implementation described herein.

The following detailed description of example implementations refers to the accompanying drawings. The same reference numbers in different drawings may identify the same or similar elements.

An entity, such as a healthcare insurance company, a healthcare provider, or the like, may wish to identify particular markets in which to provide a service and/or product, expand a service and/or product, or the like. In other words, the entity may desire to identify potential geographic areas in which to offer services or products. In doing so, the entity may attempt to ascertain a competitiveness of the potential market, estimate revenue, estimate operating margin, etc. That is, the entity may attempt to identify the potential success of the product and/or service in the potential market, and/or the likelihood of the entity gaining market share in the potential market. The entity may attempt to ascertain the foregoing based on analyzing a market share distribution of competitive entities (e.g., other healthcare insurance companies, other healthcare providers, etc.) within the target market. However, the entity may base a decision to expand into a potential market on incomplete data, which may result in the entity entering a market in which the entity fails to gain market share, fails to recognize particular revenue, or the like.

Implementations described herein may enable an insight platform to receive information associated with multiple data sources and multiple areas (i.e., geographic areas, such as towns, zip codes, cities, counties, states, countries, geographic areas represented by geographical coordinates, any combinations of the foregoing, or the like), associate the information with particular areas, identify data elements, determine data element scores, determine market indices based on the data element scores, and provide information that identifies the market indices to permit and/or cause actions to be performed. A market index, as described elsewhere herein, may include information that identifies a potential value associated with a geographic area, identifies the likelihood of an entity realizing the potential value, and/or the like.

Implementations described herein enable the insight platform to determine a market index based on data associated with disparate data sources and/or disparate areas, thereby enabling the insight platform to more accurately determine a market index associated with an area. In this way, implementations described herein may enable the insight platform to generate a market index based on data associated with disparate data sources and/or areas, thereby reducing an amount of computation required to determine market indices (e.g., as compared to determining separate market indices based on data associated with particular sources, particular areas, or the like) and thereby conserving processor and/or memory resources of computing devices and/or conserving network resources.

While some implementations described herein are described in terms of a particular entity (e.g., a healthcare provider, or the like) and/or particular items (e.g., healthcare services, healthcare products, etc.), implementations described herein may be applied to other entities (e.g., telecommunications service providers, Internet service providers, etc.) that may be associated with other items, and/or are considering operating in a particular geographic area. Implementations described herein enable the insight platform to receive various data from various data sources (e.g., a thousand data sets and/or sources, a million data sets and/or sources, etc.), and determine market indices based on the data. While implementations described herein identify particular data sets and/or data sources, implementations described herein may be applied to other data sets and/or data sources. In some implementations, the insight platform may use one or more big data techniques to efficiently process the data sets.

FIGS. 1A-1F are diagrams of an overview of an example implementation 100 described herein. As shown in FIG. 1A, and by reference number 105, an insight platform (e.g., a cloud server device) may receive, from multiple external information sources (e.g., server devices) information that includes multiple data elements. As shown by reference number 110, the insight platform may associate the information with an area. For example, as shown, the insight platform may associate particular data with particular area identifiers. As an example, particular data may be associated with a first type of area identifier (e.g., "Area ID 1"). Additionally, or alternatively, the insight platform may associate the particular data with a second type of area identifier (e.g., "Area ID 2"). In some implementations, the second type of area identifier is different than the first type of area identifier. In some implementations, the second type of area identifier is the same as the first type of area identifier. In some implementations, the insight platform may receive information, may identify an area identifier associated with the information (e.g., based on parsing the information), and may associate the information with an area based on identifying the area identifier.

Figure 1B:
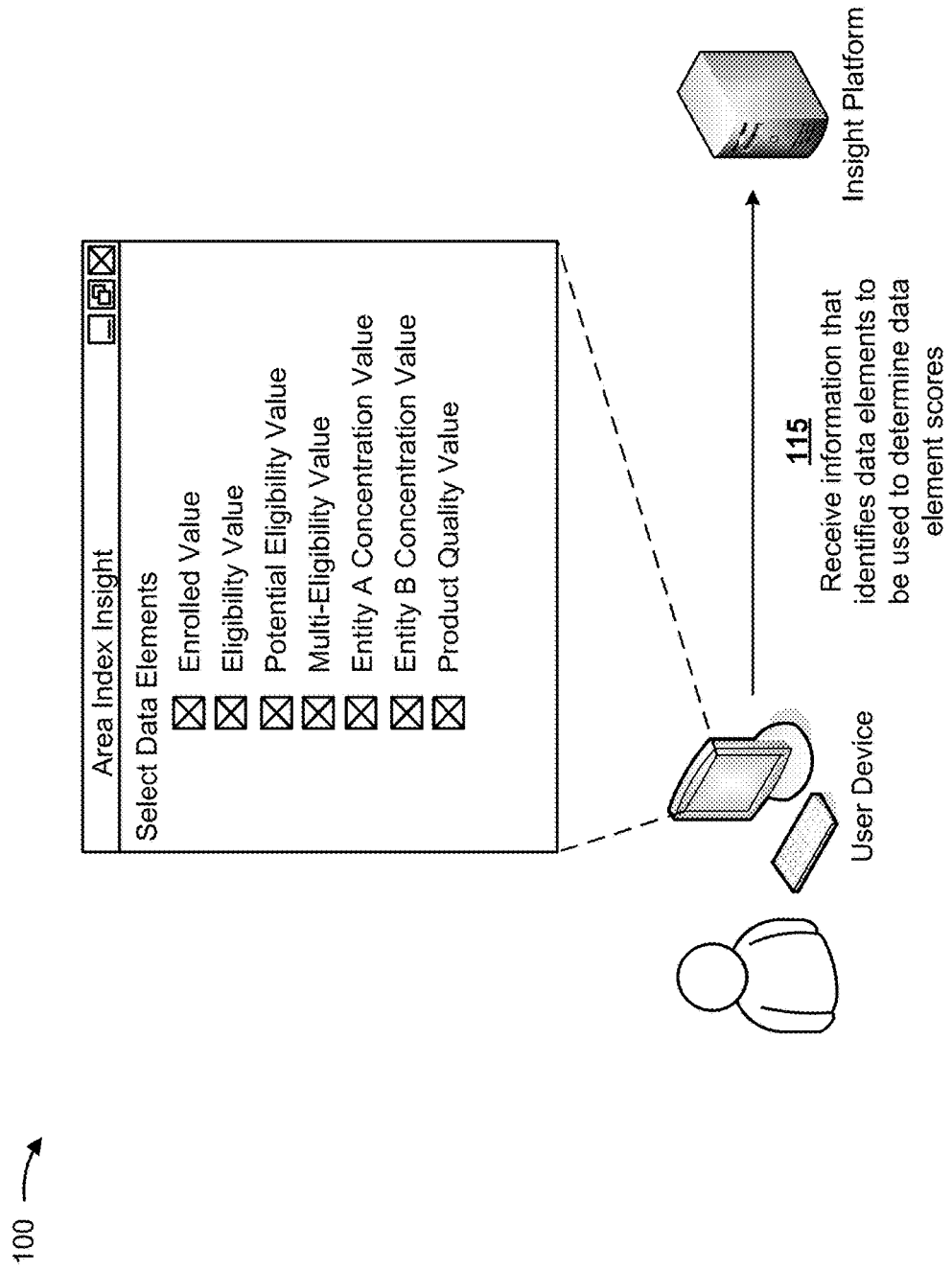

As shown in FIG. 1B, and by reference number 115, the insight platform may receive information that identifies data elements to be used to determine data element scores. For example, a user may interact with a user interface of a user device (e.g., a computing device) to select data elements. The user device may provide information that identifies data elements to the insight platform based on the user interactions with the user device. In some implementations, the insight platform may be configured to store the information that identifies data elements to be used to determine data element scores (without any interaction with a user device).

Figure 1C:
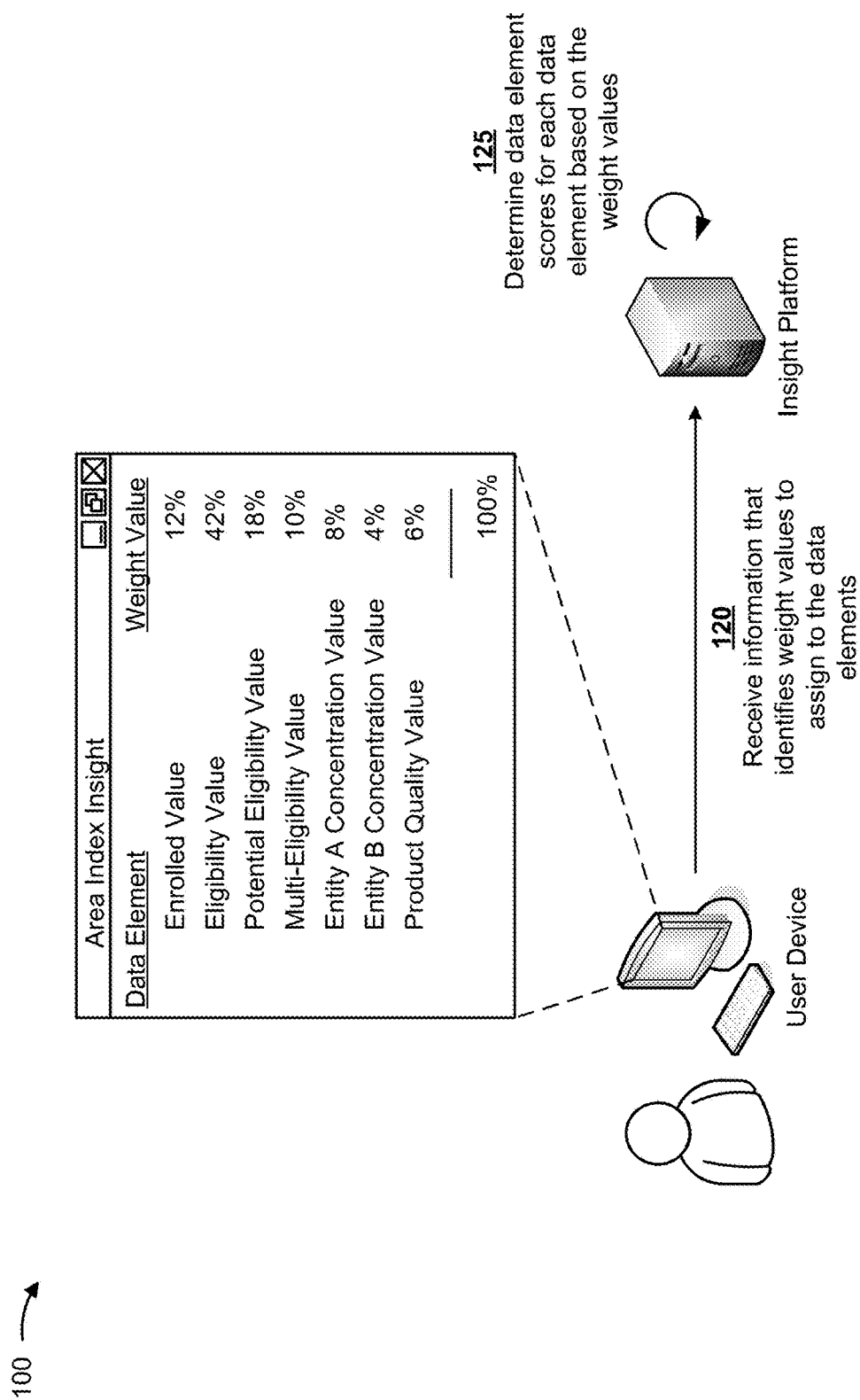

As shown in FIG. 1C, and by reference number 120, the insight platform may receive information that identifies weight values to assign to the data elements. For example, the user may interact with the user device to input the weight values. In some implementations, the insight platform may be configured to store the weight values (without any interaction with the user device).

As shown by reference number 125, the insight platform may determine data element scores for each data element based on the weight values. For example, the insight platform may determine data element scores based on associating the information with the area and based on the data elements. In some implementations, a data element score may include a value, a rank, a designation, or the like, associated with a data element. As an example, assume that a first data element (e.g., enrolled value, which identifies a number of enrolled entities) includes a particular value (e.g., 10,000). In this case, the insight platform may determine a data element score (e.g., 8) based on the particular value, and/or may adjust the data element score based on the weight value.

Figure 1D:
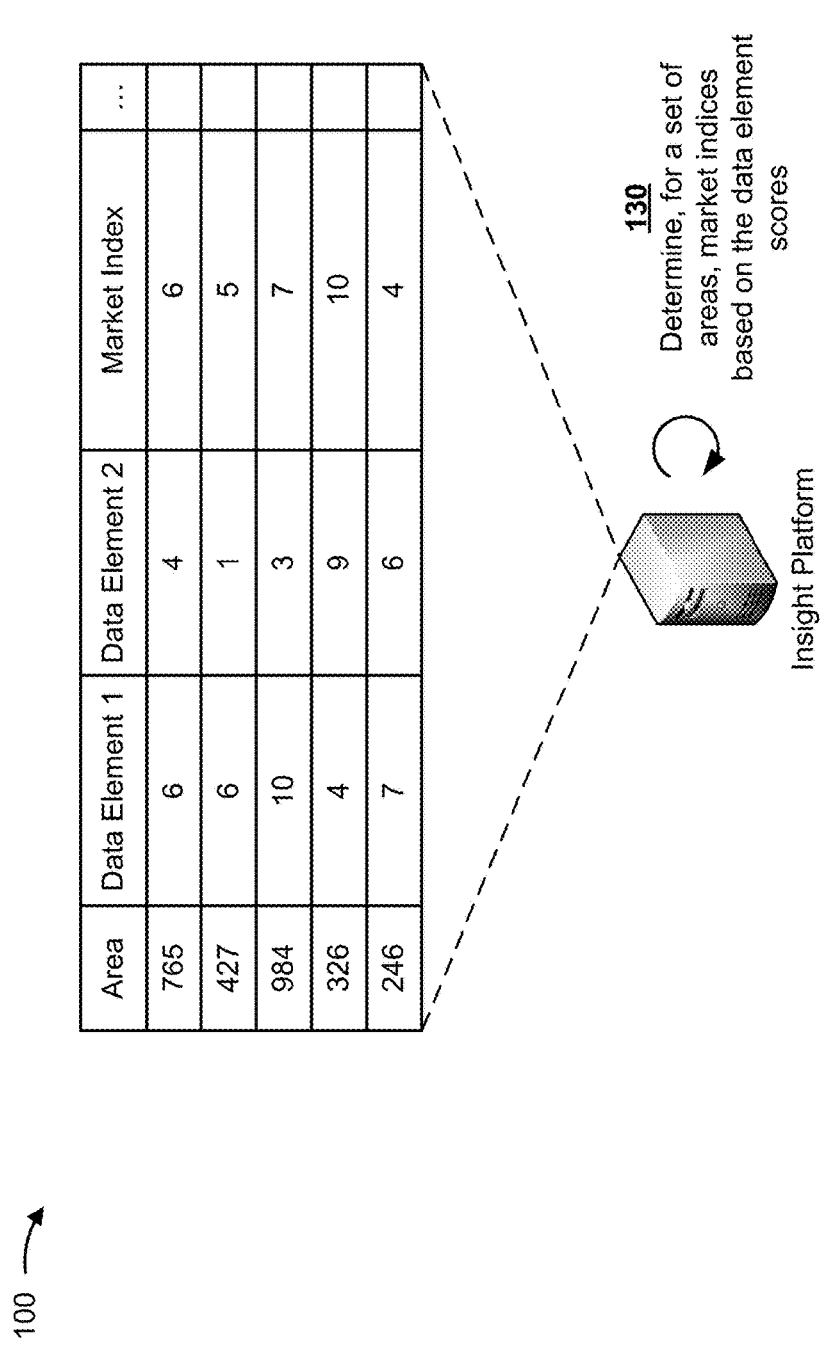

As shown in FIG. 1D, and by reference number 130, the insight platform may determine, for a set of areas, market indices based on respective data element scores. As described herein, a market index may include a value, an indicator, a score, a rank, etc. associated with an area.

Figure 1E:
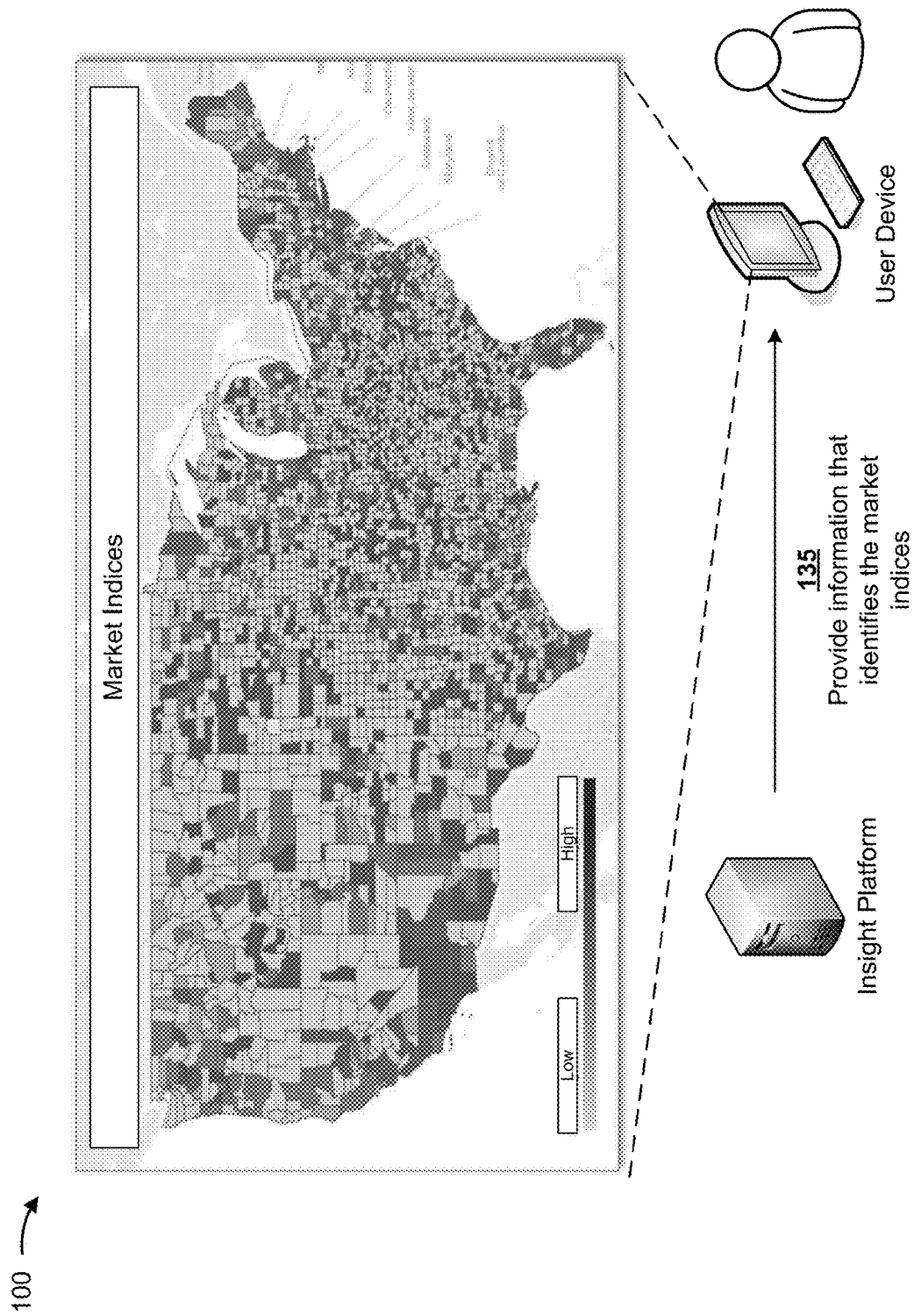

As shown in FIG. 1E, and by reference number 135, the insight platform may provide information that identifies the market indices to the user device (e.g., the user device may provide the information for display). In some implementations, the market indices may be displayed in the form of a geographic heat map that may include various colors and/or shades that may visually indicate the market indices. For example, a darker shaded portion of the heat map may indicate a higher market index relative to a lighter shaded portion, or vice versa. In some implementations, the user may interact with the user device to adjust weight values that are associated with particular data elements. In this way, the insight platform may determine updated market indices based on the adjusted weight values, and provide information that identifies the updated market indices. In this way, the user may ascertain the real-time impact of various data elements on market index determinations.

Figure 1F:
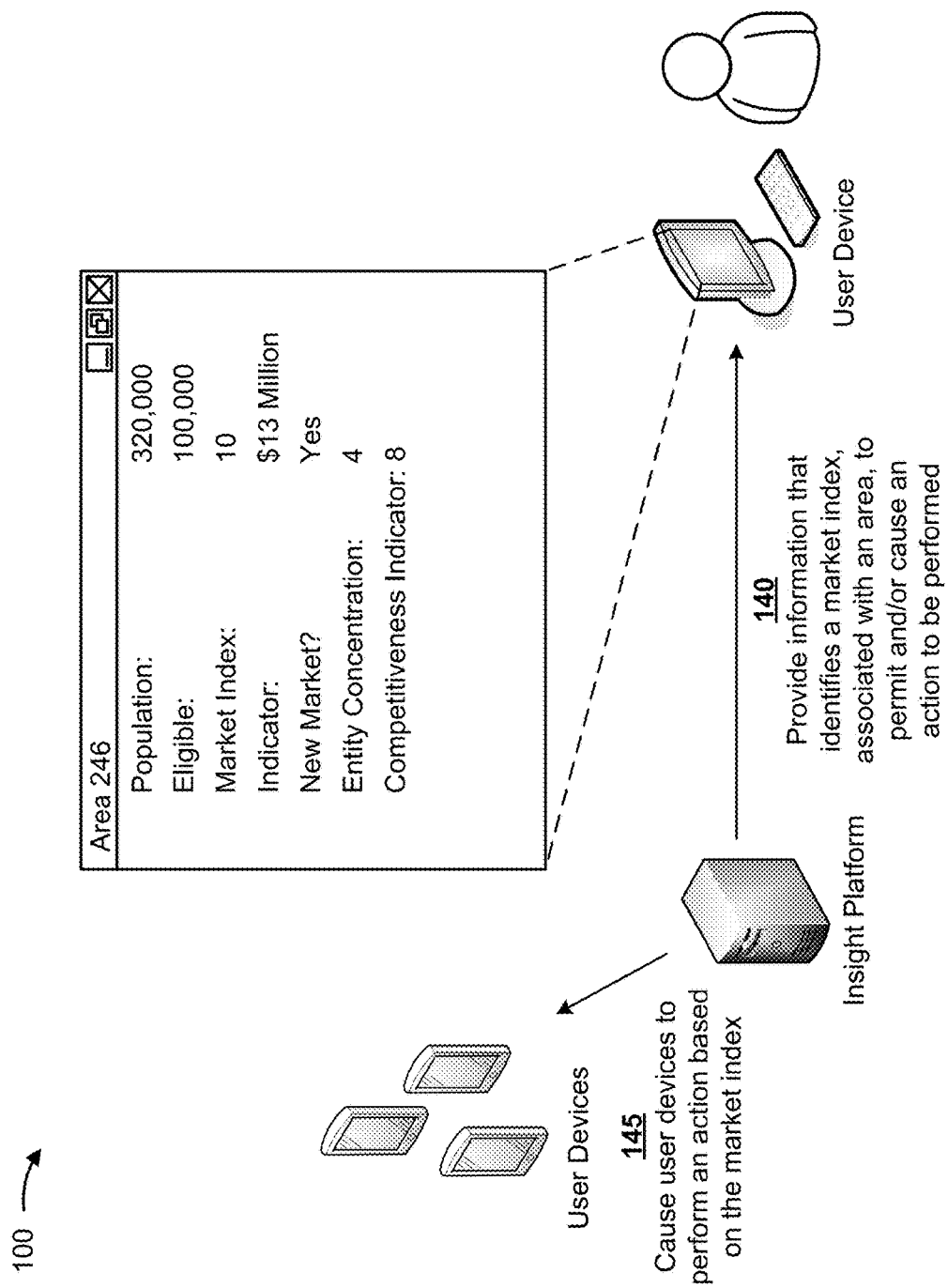

As shown in FIG. 1F, and by reference number 140, the insight platform may provide (e.g., to the user device) information that identifies a market index associated with an area to permit and/or cause an action to be performed in association with the area. For example, the insight platform may provide, to the user device and/or to other user devices, information that identifies the market index to permit and/or cause an action to be performed. In some implementations, the user device may provide information that identifies the market index for display.

As shown by reference number 145, the insight platform may cause user devices to perform an action based on the market index. As an example, the insight platform may cause user devices to implement a marketing campaign, may coordinate calendar applications associated with the user devices, or the like. In this way, the insight platform may cause an action to be performed in association with the area based on the market index (e.g., 10). Additionally, in this way, the insight platform may notify an entity that a particular area is associated with a particular market index, thereby enabling the entity to identify particular geographic areas that may yield particular revenue, may enable the entity to gain market share, or the like.

Implementations described herein enable an insight platform to determine a market index based on data associated with disparate data sources and/or disparate areas. In this way, insight platform may more accurately determine a market index associated with an area in relation to when market indices are not determined based on data associated with disparate data sources and/or disparate areas. In this way, implementations described herein may reduce situations where an entity performs particular actions in association with areas including low market indices, thereby conserving processor and/or memory resources of computing devices associated with performing the actions.

As indicated above, FIGS. 1A-1F are provided merely as an example. Other examples are possible and may differ from what was described with regard to FIGS. 1A-1F.

Figure 2:
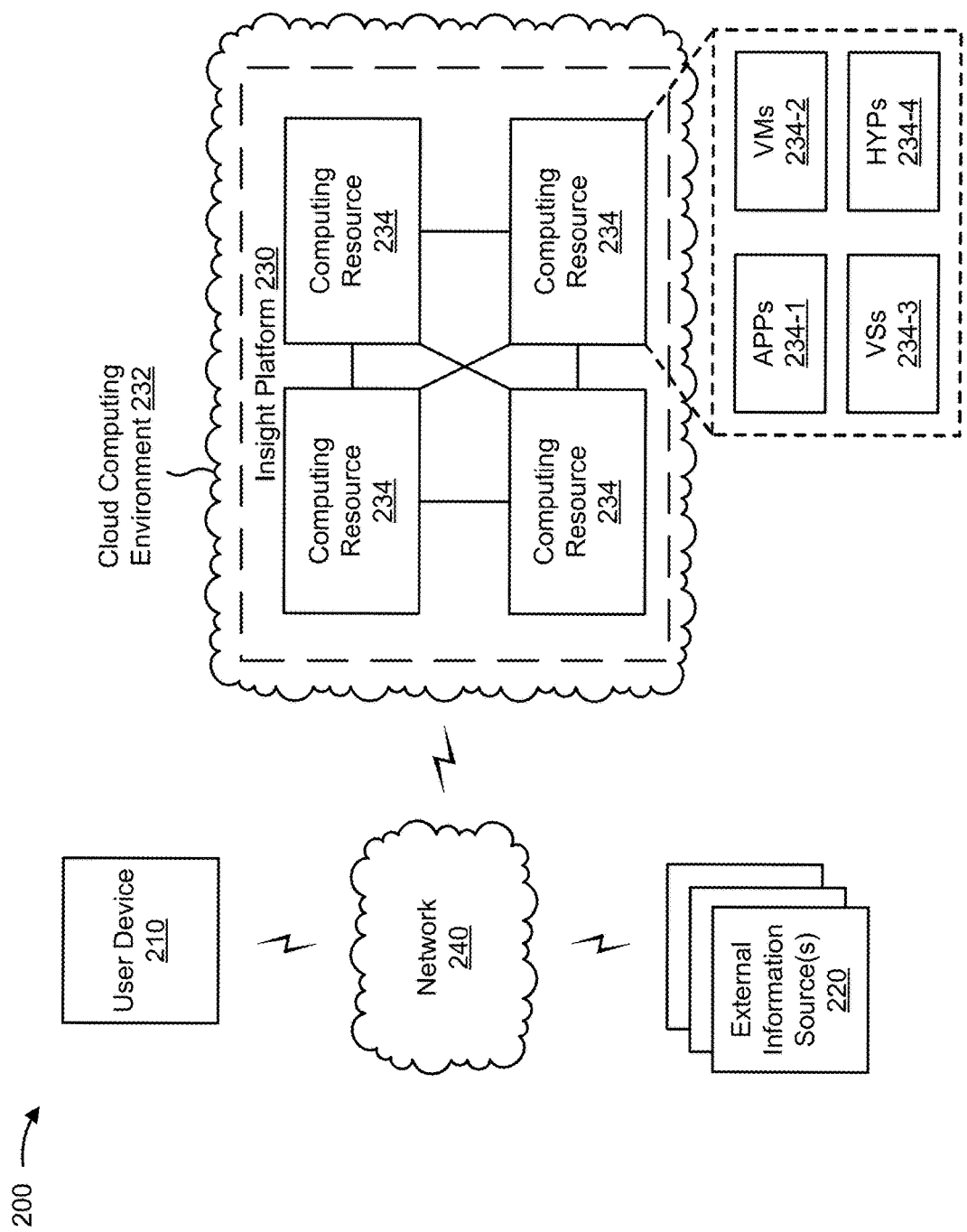
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more external information sources 220 (hereinafter referred to collectively as "external information sources 220," and individually as "external information source 220"), an insight platform 230, and a network 240. Devices of environment 200 may interconnect via wired connections, wireless connections, or a combination of wired and wireless connections.

User device 210 includes one or more devices capable of receiving, generating, storing, processing, and/or providing information associated with an entity. For example, user device 210 may include a computing device (e.g., a desktop computer, a laptop computer, a tablet computer, a handheld computer, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to insight platform 230.

External information source 220 includes one or more devices, accessible through a network, that are sources of information relevant to market indices associated with an area. For example, external information source 220 may include a server that includes information associated with a data element. For example, external information source 220 may include a server or a group of servers (e.g., a cloud-based server, an application device, a content server, a host server, a web server, a database server, etc.), a desktop computer, or a similar device.

Insight platform 230 includes one or more devices capable of receiving information that includes multiple data elements, associating the information with an area, determining data element scores, determining a market index for the area based on the data element scores, and/or providing information that identifies the market index to permit and/or cause an action to be performed, as described elsewhere herein. In some implementations, insight platform 230 may be designed to be modular such that certain software components can be swapped in or out depending on a particular need. As such, insight platform 230 may be easily and/or quickly reconfigured for different uses.

In some implementations, as shown, insight platform 230 may be hosted in cloud computing environment 232. Notably, while implementations described herein describe insight platform 230 as being hosted in cloud computing environment 232, in some implementations, insight platform 230 may not be cloud-based (i.e., may be implemented outside of a cloud computing environment) or may be partially cloud-based.

Cloud computing environment 232 includes an environment that hosts insight platform 230. Cloud computing environment 232 may provide computation, software, data access, storage, etc. services that do not require end-user (e.g., user device 210) knowledge of a physical location and configuration of system(s) and/or device(s) that hosts insight platform 230. As shown, cloud computing environment 232 may include a group of computing resources 234 (referred to collectively as "computing resources 234" and individually as "computing resource 234").

Computing resource 234 includes one or more personal computers, workstation computers, server devices, or other types of computation and/or communication devices. In some implementations, computing resource 234 may host insight platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 includes a group of cloud resources, such as one or more applications ("APPs") 234-1, one or more virtual machines ("VMs") 234-2, virtualized storage ("VSs") 234-3, one or more hypervisors ("HYPs") 234-4, or the like.

Application 234-1 includes one or more software applications that may be provided to or accessed by client device 205. Application 234-1 may eliminate a need to install and execute the software applications on client device 205. For example, application 234-1 may include software associated with insight platform 230 and/or any other software capable of being provided via cloud computing environment 232. In some implementations, one application 234-1 may send/receive information to/from one or more other applications 234-1, via virtual machine 234-2.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., client device 205), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 may provide hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
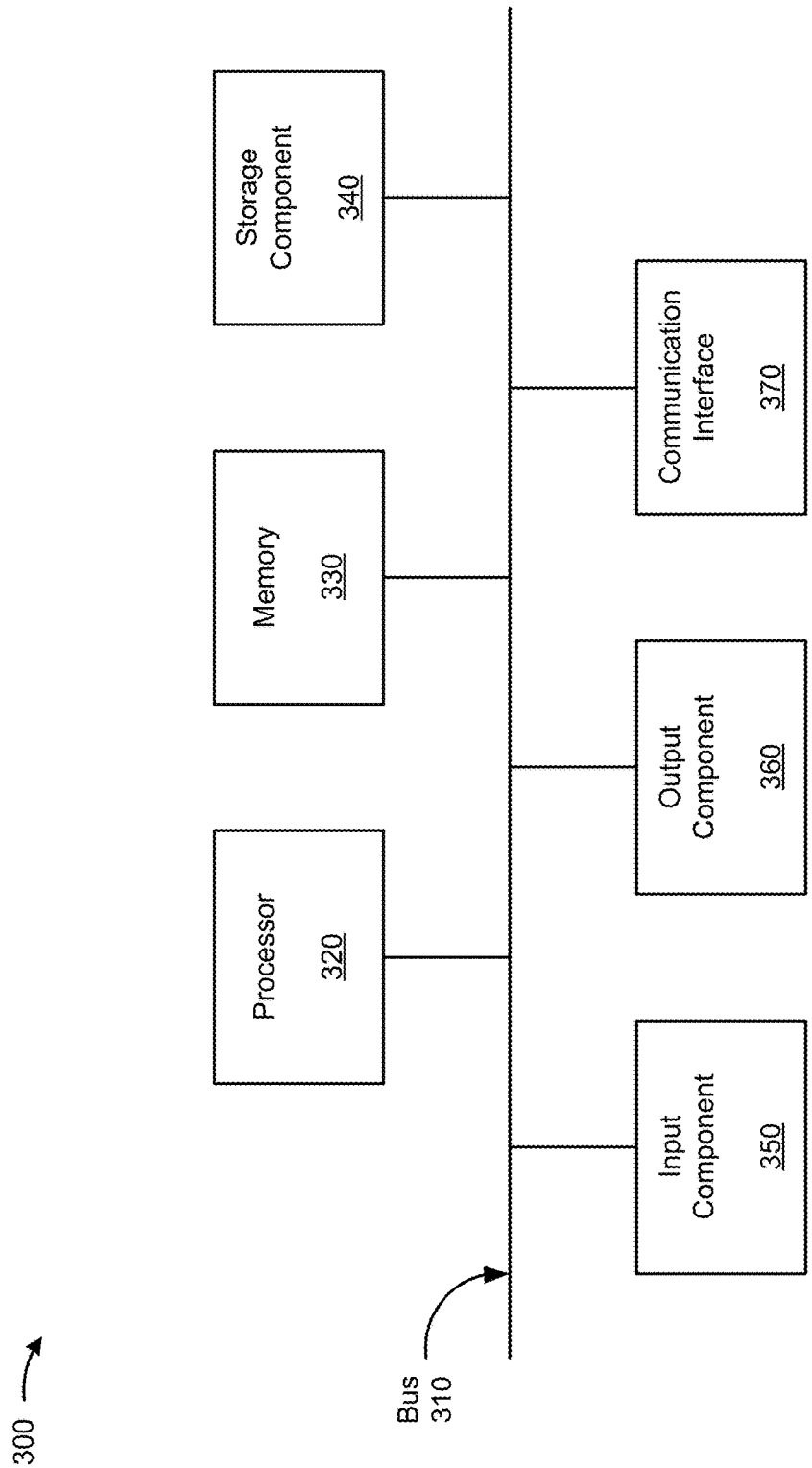
FIG. 3 is a diagram of example components of one or more devices of FIG. 2.

FIG. 3 is a diagram of example components of a device 300. Device 300 may correspond to user device 210, external information source 220, and/or insight platform 230. In some implementations, user device 210, external information source 220, and/or insight platform 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
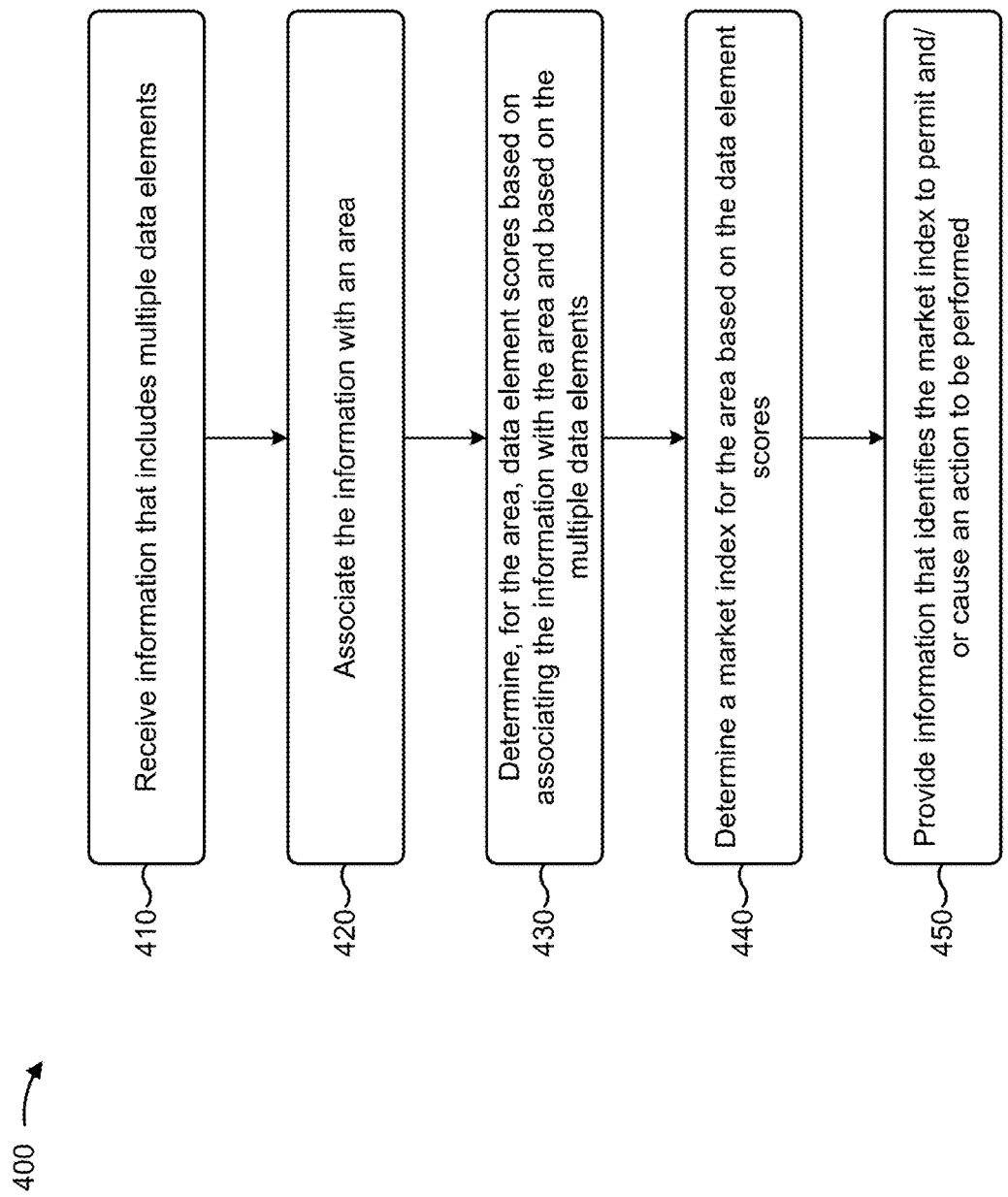
FIG. 4 is a flow chart of an example process for determining a market index for an area.

FIG. 4 is a flow chart of an example process 400 for determining a market index for an area. In some implementations, one or more process blocks of FIG. 4 may be performed by insight platform 230. In some implementations, one or more process blocks of FIG. 4 may be performed by another device or a group of devices separate from or including insight platform 230, such as user device 210 and/or external information source 220.

As shown in FIG. 4, process 400 may include receiving information that includes multiple data elements (block 410). For example, insight platform 230 may receive, from user device 210 (e.g., which may have received an input from a user), information including multiple data elements. In some implementations, insight platform 230 may be configured to receive the information that includes the multiple data elements (without any interaction with a user device). In some implementations, insight platform 230 may utilize the information to determine a market index for an area, as described elsewhere herein.

In some implementations, insight platform 230 may use particular information to determine a market index for a particular entity. For example, an entity may include a user, an organization, a company, an institution, and/or the like. In some implementations, an entity may include a member, such as an individual that may purchase a product, undergo a service, or the like. Additionally, or alternatively, an entity may include a payer, such as an organization that may offer a service, offer a product, or the like (e.g., offer a service to a member). Additionally, or alternatively, an entity may include a provider, such as an organization that may offer a service, offer a product, or the like, to a member. As used herein, an item may refer to a product, a service, a good, a commodity, etc. For example, as used herein, offering an item may refer to offering a product, offering a service, offering an accommodation, etc.

In some implementations, the information may include a resource that includes text (e.g., a document, a webpage, or the like). Additionally, or alternatively, the information may include a resource identifier (e.g., a uniform resource identifier (URI), a uniform resource locator (URL), a uniform resource name (URN), a network address, a database address, or the like). Additionally, or alternatively, the resource may be associated with a particular file type and/or format (e.g., a hypertext markup language (HTML) file, an extensible markup language (XML) file, a text file, a comma-separated values (CSV) file, a portable document format (PDF) file, a word processing file, a spreadsheet file, a zipped file, or the like). Additionally, or alternatively, the resource may be associated with a particular source (e.g., a source that generated the information associated with the resource, a device that stores the resource, or the like). In some implementations, the information may include multiple resources (e.g., documents, webpages, etc.) that may be associated with different file types and/or different sources.

In some implementations, insight platform 230 may receive the information based on a user input (e.g., via user device 210). For example, a user may interact with user device 210, and may input information that identifies a resource identifier, an area identifier (e.g., a postal code, an area code, etc.), or the like. In some implementations, insight platform 230 may store a profile associated with an entity. For example, a profile may include stored information associated with the entity. In some implementations, a user may interact with user device 210 to create and/or modify a profile associated with an entity (e.g., input resource identifiers, configure entity information, upload resources, or the like). Additionally, insight platform 230 may store information associated with the profile (e.g., in a data structure). In some implementations, a user may interact with user device 210 to modify a profile (e.g., input additional information, remove information, etc.). In this way, insight platform 230 may determine particular actions to be performed based on information associated with the profile, as described elsewhere herein. In some implementations, insight platform 230 may store multiple profiles associated with multiple entities, respectively (e.g., hundreds, thousands, millions, etc. of entities).

In some implementations, insight platform 230 may obtain a resource based on the information (e.g., based on one or more resource identifiers). For example, insight platform 230 may receive, from user device 210, information that identifies text and/or a memory location at which the text is stored. In some implementations, insight platform 230 may be configured to receive the information that identifies the text, and/or may obtain the resource (without any interaction with the user device). Additionally, or alternatively, insight platform 230 may perform a technique (e.g., a web crawling technique, a web scraping technique, a data mining technique, a web searching technique, a database searching technique, or the like), and may receive the information including the multiple data elements based on the technique. In some implementations, insight platform 230 may provide requests, to external information sources 220, for the information.

In some implementations, insight platform 230 may obtain text (e.g., based on a user input and/or a resource identifier), and may prepare the text for processing to extract data elements. In some implementations, insight platform 230 may determine text sections to be processed. For example, insight platform 230 may determine a manner in which the text is to be partitioned into text sections, and may partition the text into text sections. A text section may include, for example, a field, a sentence, a line, a paragraph, a page, a document, or the like. In some implementations, insight platform 230 may process each text section separately (e.g., serially or in parallel). By partitioning the text into text sections, insight platform 230 may not have to process each text section of the text, thereby conserving processor and/or memory resources.

In some implementations, insight platform 230 may prepare the text for processing (e.g., one or more text sections). For example, insight platform 230 may standardize the text to prepare the text for processing. As an example, the text may be associated with different file types and/or different file formats, and/or the text may include particular discrepancies relating to other text. In this way, insight platform 230 may standardize the text, such that the text may be represented in a particular format, thereby conserving processor and/or memory resources by enabling more efficient processing. In some implementations, insight platform 230 may identify a file type associated with the text, and may determine a technique to standardize the text based on the file type. As an example, insight platform 230 may identify that particular text is associated with a first file type (e.g., a CSV file), and may implement a particular technique to standardize the text. Further, insight platform 230 may identify that other text is associated with a second file type (e.g., a PDF file), and may implement a different technique to standardize the text.

In some implementations, insight platform 230 may prepare the text for processing by adjusting characters in the text, such as by removing characters, replacing characters, adding characters, adjusting a font, adjusting formatting, adjusting spacing, removing white space, or the like. For example, insight platform 230 may replace multiple spaces with a single space, may insert a space after a left parenthesis, a left brace, a left bracket, etc., may insert a space before a right parenthesis, a right brace, a right bracket, etc. In this way, insight platform 230 may use a space delimiter to more easily parse the text, thereby improving accuracy of the use of the text and/or thereby conserving processor and/or memory resources. In some implementations, insight platform 230 may further prepare the text for processing by expanding acronyms in the text, determining words in the text (e.g., by determining characters identified by one or more delimiting characters), associating part-of-speech tags (POS tags) with words in the text, or the like. In this way, insight platform 230 may improve the accuracy of the use of the text, thereby conserving processor and/or memory resources.

In some implementations, insight platform 230 may identify terms included in the text, and may generate a corpus of terms by generating a data structure that stores terms extracted from the text. A term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like. Additionally, or alternatively, insight platform 230 may receive information that identifies particular terms to be used to perform data element identification. By generating the data structure that stores terms extracted from the text, insight platform 230 may process the text more efficiently than if the text were processed without first generating the data structure, thereby conserving processor and memory resources.

In some implementations, insight platform 230 may identify a data element based on identifying a pattern in the text. For example, insight platform 230 may identify a pattern in the text (e.g., a particular sequence and/or combination of characters, words, terms, etc. that appear in the text), and may identify a data element based on identifying the pattern in the text. In some implementations, insight platform 230 may identify a data element based on identifying a particular pattern (e.g., a particular sequence and/or combination of characters, words, terms, etc. that appear in the text), such as by using a regular expression, a basic regular expression, an extended regular expression, or the like. For example, insight platform 230 may identify a term associated with a data element, and may identify a data element based on identifying other terms in relation to the term associated with the element (e.g., terms in a same sentence as the term, terms in a same paragraph as the term, terms in a same table as the term, terms in a same document as the term, etc.).

In some implementations, insight platform 230 may utilize another technique (e.g., a machine learning technique, such as a pattern recognition technique, a data mining technique, a heuristic technique, a supervised learning technique, a classification technique, or the like) to process the text and identify data elements. For example, a technique may receive, as input, information that identifies known data elements and corresponding text associated with the known attributes (e.g., corresponding terms, corresponding terms associated with particular POS tags, corresponding sequences of terms, corresponding patterns, or the like), and may correlate the corresponding text with the known data elements. In this way, insight platform 230 may receive text, and may implement the technique (e.g., a trained model) to identify data elements based on the text.

In some implementations, a data element may be associated with a particular entity, or a set of entities (e.g., a provider, a payer, and/or a member). Additionally, or alternatively, a data element may be associated with a particular area, or a set of areas, as described in more detail elsewhere herein. In some implementations, a data element may be associated with a particular entity (e.g., a member). For example, a data element may include demographic data, such as information that identifies a number of individuals associated with an area, ages of the individuals, races of the individuals, income levels of the individuals, employment information for the individuals, or the like.

Additionally, or alternatively, a data element may include eligibility data, such as information that identifies a number of individuals that are eligible for a particular item (e.g., Medicare, Medicaid, health insurance, etc.). For example, eligibility data may include information that identifies a number of individuals that are eligible for an item based on an age, a health condition, a status, and/or the like. Additionally, or alternatively, a data element may include potential eligibility data, such as information that identifies a number of individuals that are expected to become eligible for an item (e.g., expected to become eligible based on an age, a health condition, or the like). Additionally, or alternatively, a data element may include dual eligibility data, such as information that identifies a number of individuals that are eligible for multiple items (e.g., Medicare, Medicaid, or the like). Additionally, or alternatively, a data element may include enrolled data, such as information that identifies a number of individuals that have acquired a particular item, or the like.

In some implementations, a data element may be associated with another entity (e.g., a payer). For example, a data element may include payer concentration data, such as information that identifies a number of entities associated with a particular area, a market share of each of the respective entities, particular items offered by the respective entities, a number of members associated with an entity (e.g., that have acquired an item), and/or the like. Additionally, or alternatively, a data element may include enrollment data, such as information that identifies a number of members associated with a particular item. Additionally, or alternatively, a data element may include quality ranking data, such as information that identifies a ranking of a particular item (e.g., a ranking generated by a particular organization, institution, or the like).

In some implementations, a data element may be associated with another entity (e.g., a provider). For example, a data element may include provider concentration data, such as information that identifies a number of entities (e.g., providers) associated with a particular area. Additionally, or alternatively, a data element may include claim data, such as information that identifies a number of claims (e.g., inpatient claims, etc.) associated with a particular area, associated with a particular provider location (e.g., a hospital, a particular treatment center, or the like). Additionally, or alternatively, a data element may include spending data, such as information that identifies an amount associated with claims (e.g., inpatient claims, or the like). Additionally, or alternatively, a data element may include service area data, such as information that identifies area identifiers (e.g., postal codes, area codes, etc.) associated with entities (e.g., patients) of a particular provider location (e.g., hospital), or the like. Additionally, or alternatively, a data element may include medical record data, such as information that identifies a number of entities having a particular diagnosis (e.g., based on current procedural terminology (CPT) codes, or the like), a number of entities having a particular health condition, or the like.

In some implementations, insight platform 230 may receive information that includes multiple data elements, may process the information, and may identify particular data elements based on processing the information. In this way, insight platform 230 may associate the information with an area, and may determine market indices for the area based on the data elements, as described elsewhere herein.

As further shown in FIG. 4, process 400 may include associating the information with an area (block 420). For example, insight platform 230 may associate the information with an area. As described herein, an area may refer to a geographic area in which an entity may operate. For example, an entity may operate, in association with a particular area, by offering an item, purchasing an item, providing an item, developing an item, advertising an item, and/or the like. In some implementations, a geographic area, as described elsewhere herein, may include a town, a city, a zip code, a county, a micropolitan statistical area, a metropolitan statistical area (MSA), a core based statistical area (CBSA), a state, and/or the like.

In some implementations, insight platform 230 may associate the information with an area based on an area identifier. For example, an area identifier may include information that identifies a particular area. In some implementations, an area identifier may include a postal code, an area code, a county identifier code, an MSA identifier, a CBSA identifier, a state identifier, a region identifier, a country identifier, or the like. In some implementations, insight platform 230 may identify an area identifier associated with the information, and may associate the information with an area based on the area identifier. Additionally, or alternatively, insight platform 230 may implement one or more techniques to associate information with an area (e.g., a geotagging technique, a geocoding technique, a technique including geospatial metadata, or the like).

In some implementations, first information may be associated with a first area identifier (e.g., a first type of area identifier (e.g., a postal code), a first area identifier (e.g., 20001), or the like). Additionally, or alternatively, second information may be associated with a second area identifier (e.g., a second type of area identifier that is different than the first type of area identifier (e.g., an MSA identifier), a second area identifier that is different than the first area identifier (e.g., 8840), or the like). Additionally, or alternatively, insight platform 230 may associate the first information and the second information with the area.

As an example, assume that the first information is associated with a first area identifier, and that the second information is associated with a second area identifier. Additionally, assume that a third area identifier is common to both the first area identifier and the second area identifier (e.g., includes an overlapping geographical area, or the like). In this case, insight platform 230 may associate the first information and the second information with the third area identifier. In some implementations, the third area identifier may be the same type as the first area identifier and/or the second area identifier, and/or may be the same area identifier as the first area identifier and/or the second area identifier.

In this way, insight platform 230 may use disparate data (e.g., associated with different areas) when determining market indices for a particular area. Additionally, in this way, insight platform 230 may determine a market index, for an area, based on multiple sets of data, rather than determining multiple market indices for different areas, and then determining a market index based on the market indices. In this way, insight platform 230 may reduce a quantity of computations required to determine a market index, thereby conserving processor and/or memory resources of computing devices associated with market index determination.

In some implementations, insight platform 230 may store information that identifies particular data elements associated with particular areas, associated with multiple areas, or the like. Additionally, or alternatively, insight platform 230 may receive, from user device 210, information that identifies a particular area (e.g., for which to determine a market index). In this case, insight platform 230 may identify, based on the stored information, information that is associated with the particular area, and may determine data element scores, as described below. In some implementations, insight platform 230 may be configured with information that identifies particular areas for which to determine market indices, and may determine the market indices based on the configuration (without any interaction with the user device).

As further shown in FIG. 4, process 400 may include determining, for the area, data element scores based on associating the information with the area and based on the multiple data elements (block 430). For example, insight platform 230 may determine, for the area, data element scores based on associating the information with the area and based on the data elements. In some implementations, a data element score may include a value, a rank, a designation, or the like, associated with a data element. In some implementations, a particular data element may be capable of being associated with one or more values, ranks, designations, or the like. As an example, assume that a particular data element is capable of being associated with a particular range of values (e.g., value ranges including 0-10, 10-20, 20-30, etc.). In this case, insight platform 230 may determine a first data element score (e.g., 0) based on a first value range (e.g., 0-10), may determine a second data element score based on a second value range (e.g., 10-20), etc.

In some implementations, insight platform 230 may apply a weight value to a data element, and may determine a data element score based on the weight value. Additionally, or alternatively, insight platform 230 may apply different weight values to different data elements, and may determine multiple data element scores based on applying the different weight values. For example, assume that insight platform 230 is configured to determine a market index based on four data elements. As an example, insight platform 230 may apply a first weight value (e.g., 0.30) to a first data element, may apply a second weight value to a second data element (e.g., 0.15), may apply a third weight value to the third data element (e.g., 0.25), and may apply a fourth weight value to the fourth data element (e.g., 0.30). In this case, the first data element may represent 30% of the market index, the second data element may represent 15% of the market index, the third data element may represent 25% of the market index, and the fourth data element may represent 30% of the market index.

In some implementations, insight platform 230 may determine and/or apply a weight value based on a technique. For example, insight platform 230 may implement a technique, may identify a type of data element, and may apply a particular weight value based on the type of data element. Additionally, or alternatively, insight platform 230 may implement a technique, may determine a data element score, for a particular data element, and may determine a market index based on the data element score.

In some implementations, insight platform 230 may determine data element scores for each of the multiple data elements, for a subset of the data elements, or the like. For example, insight platform 230 may receive, from user device 210, information that identifies particular data elements for which to determine data element scores. Additionally, or alternatively, insight platform 230 may receive, from user device 210, information that identifies particular weight values to apply to particular data elements. Additionally, or alternatively, insight platform 230 may receive, from user device 210, information that identifies particular thresholds associated with particular data elements, as described elsewhere herein. In some implementations, insight platform 230 may be configured to identify particular data elements, to apply particular weight values, to apply particular thresholds, and/or the like (without any interaction with the user device).

In some implementations, insight platform 230 may determine particular data elements, for which to determine data element scores, based on an entity. For example, an entity may desire to determine a particular market index, as described elsewhere herein. In some implementations, insight platform 230 may identify the entity, and may determine particular data elements based on the entity. As an example, a first entity may desire to determine a first market index that is based on a first set of data elements (and/or data element scores). Additionally, a second entity may desire to determine a second market index that is based on a second set of data elements that is different than the first set of data elements. In other words, different data elements may be of greater importance to the first entity as compared to the second entity. In this case, insight platform 230 may determine a particular set of data elements, that are associated with an entity, and may determine data element scores for the particular set of data elements. In some implementations, insight platform 230 may use a machine learning technique to determine particular data elements for which to determine data element scores. For example, insight platform 230 may receive information that identifies known data elements that are associated with a known particular type of entity, may correlate the known data elements and the known particular type of entity (e.g., to train a model). Additionally, insight platform 230 may receive information that identifies an entity (e.g., for which to determine a market index), and may determine data elements to be used to determine the market index (e.g., based on the model).

As further shown in FIG. 4, process 400 may include determining a market index for the area based on the data element scores (block 440). For example, insight platform 230 may determine a market index for the area based on the data element scores. As described herein, a market index may include a value, an indicator, a score, a rank, etc. associated with an area.

In some implementations, a market index may indicate a particular viability of operating in association with an area. In some implementations, insight platform 230 may determine a market index, for the area, based on aggregating the data element scores. For example, insight platform 230 may determine a market index based on performing one or more mathematical operations in association with the data element scores (e.g., aggregating the data element scores, averaging the data element scores, etc.). Additionally, or alternatively, may determine whether a data element score, for a particular data element, satisfies a threshold, and may determine a market index based on whether the data element score satisfies the threshold. Additionally, or alternatively, insight platform 230 may determine whether multiple data element scores, for different data elements, satisfy thresholds. For example, insight platform 230 may receive information, from user device 210, that identifies that a particular data element should include a data element score that satisfies a threshold. Additionally, or alternatively, insight platform 230 may determine if the data element score satisfies the threshold, and may determine a market index based on the data element score satisfying the threshold.

As an example, assume that an entity desires to determine market indices for areas associated with particular data element scores that satisfy a threshold (e.g., greater than 10,000 eligible members). In this case, insight platform 230 may not determine market indices for areas that include data element scores that do not satisfy the threshold, may prevent information associated the market indices from being provided to user device 210, or the like.

In some implementations, insight platform 230 may determine a market index, for the area, based on a model. For example, insight platform 230 may use machine learning techniques to analyze data (e.g., training data, such as historical data, etc.) and create models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, or the like. In some implementations, the technique may receive known data element scores and a known market index as input, and may associate the known data element scores and the known market index (e.g., to train a model). Additionally, the technique may determine data element scores associated with an entity, and may determine a market index based on the technique (e.g., based on implementing the model). In some implementations, insight platform 230 may use another kind of computer-implemented technique, such as artificial intelligence, machine perception, or computer vision, to analyze data element scores (and/or other data) and determine a market index. In some implementations, insight platform 230 may create a model using information associated with a first area (e.g., training data), and may use the model in association with information relating to a second area.

In some implementations, insight platform 230 may determine market indices for multiple areas. For example, insight platform 230 may determine a first market index for a first area based on data element scores associated with the first area. Additionally, insight platform 230 may determine a second market index for a second area based on data element scores associated with the second area. Additionally, or alternatively, insight platform 230 may identify a first area and a second area, may determine that the second area is similar to the first area (e.g., similar geographic location, similar demographic information, or the like), and may determine a market index for the second area based on data element scores associated with the first area (e.g., may use the data element scores associated with the first area, may combine data element scores, may weigh the data element scores, or the like).

In some implementations, insight platform 230 may determine multiple market indices for an area based on different combinations of data elements and/or data element scores. For example, insight platform 230 may determine market indices for an area based on different permutations of data element combinations. In this way, insight platform 230 may provide information that identifies particular market indices for an area, thereby enabling an entity to determine whether to operate in the area, or the like.

In this way, insight platform 230 may compare the market indices, and may provide information that identifies the market indices to permit and/or cause an action to be performed, as described elsewhere herein.

As further shown in FIG. 4, process 400 may include providing information that identifies the market index to permit and/or cause an action to be performed (block 450). For example, insight platform 230 may provide, to user device 210 and/or another device, information that identifies the market index to permit and/or cause an action to be performed. In some implementations, insight platform 230 may provide, to user device 210 (e.g., which may provide information for display via a user interface), information that identifies the market index (e.g., to cause user device 210 to provide the information for display). For example, user device 210 may provide information that identifies the market index for display.

In some implementations, user device 210 may provide information that identifies multiple (e.g., a hundred, a thousand, a million, etc.) market indices, corresponding to multiple areas, for display. For example, user device 210 may provide a graphical representation (e.g., a heat map, or the like) that identifies multiple areas and corresponding market indices. In some implementations, user device 210 may provide various infographics for display (e.g., plots, charts, graphs, etc.) based on the market indices. In some implementations, user device 210 may provide information that identifies areas associated with particular market indices (e.g., the top ten greatest market indices, the top ten lowest market indices, or the like). Additionally, or alternatively, user device 210 may provide information that identifies areas associated with particular data elements that include particular data element scores. In some implementations, user device 210 may receive (e.g., based on a user input) information identifying particular data elements, data element scores, and/or market indices. Additionally, or alternatively, user device 210 may provide, for display, information that identifies areas associated with the particular data elements, the particular data element scores, and/or the particular market indices. In some implementations, user device 210 may provide information associated with an interactive infographic for display. For example, user device 210 may receive a user input (e.g., a user interaction with user device 210), and may provide updated information for display (e.g., may update information that is being provided for display, such as providing additional information associated with an area, or the like).

In some implementations, insight platform 230 may permit and/or cause recommendation information to be generated based on the market index. For example, recommendation information may include information that identifies a recommendation as to whether an entity should perform an action in association with a particular area (e.g., offer an item, develop items to be provided, etc.). In some implementations, insight platform 230 may receive information associated with a profile of an entity (e.g., as described elsewhere herein), and may use the information to determine recommendation information associated with the area. For example, insight platform 230 may receive information that identifies areas in which a particular entity is already operating (e.g., offering an item, etc.), information that identifies particular items that the entity is providing in association with the area, information that identifies particular items that the entity may offer in association with the area (e.g., are capable of being offered), information that identifies other entities that the entity is associated with (e.g., partnered with), information about other entities that offer a similar item (e.g., competitors, the areas in which the competitors are operating, etc.), or the like.

In some implementations, insight platform 230 may provide recommendation information associated with a particular area. For example, insight platform 230 may determine particular areas (e.g., areas associated with market indices that satisfy a threshold), and may determine recommendation information, as described below. Additionally, or alternatively, insight platform 230 may receive, from user device 210, information that identifies a particular area, and may determine recommendation information for the particular area. For example, assume that a user selects a particular area based on a market index. In this case, insight platform 230 may determine recommendation information for the particular area. In some implementations, insight platform 230 may be configured to determine recommendation information for a particular area (without any interaction with the user device).

In some implementations, insight platform 230 may determine an indicator value, such as a value that identifies a potential revenue associated with an area (e.g., revenue that may be realized if an entity operates in the area), a value that identifies an operating profit, a value that identifies a contribution margin, a value that identifies an operating margin, or the like. In some implementations, insight platform 230 may determine an indicator value based on particular data elements associated with the area (e.g., eligibility data, potential eligibility data, medical record data, service area data, or the like). For example, insight platform 230 may determine an indicator value based on one or more data elements, such as information that identifies a number of entities, associated with an area, that may require and/or opt to purchase a particular item, health condition information associated with entities of the area, or the like.

In some implementations, insight platform 230 may determine an indicator value for a particular item. For example, insight platform 230 may determine a utilization value of the particular item in association with the area based on one or more data elements. Additionally, or alternatively, insight platform 230 may compare the utilization value and a utilization indicator (e.g., an average utilization associated with other areas, or the like). For example, insight platform 230 may determine whether the utilization value of the item satisfies the utilization indicator. Additionally, or alternatively, insight platform 230 may determine an indicator value based on the utilization value satisfying the utilization indicator. Additionally, or alternatively, may determine a competitiveness indicator value, such as a value that identifies a competitiveness of the area. For example, insight platform 230 may determine a competitiveness indicator value based on one or more data elements, such as information that identifies a quantity of other entities (e.g., competitors) associated with the area (e.g., that operate in the area), market shares of the other entities, or the like. In other words, insight platform 230 may determine a viability of offering the item in association with the area (e.g., an estimate as to the probability of the entity realizing potential revenue, gaining market share, or the like). Additionally, or alternatively, insight platform 230 may provide recommendation information based on the indicator value, the utilization value, and/or the competitiveness indicator value to permit and/or cause an action to be performed. For example, insight platform 230 may determine whether the indicator value, the utilization value, and/or the competitiveness indicator value satisfy respective thresholds, and may provide recommendation information based on the particular values satisfying the respective thresholds.

In some implementations, insight platform 230 may permit and/or cause another action to be performed based on the market index. For example, insight platform 230 may cause a message (e.g., an email or a short message service (SMS) message) to be sent to user device 210 based on the market index. In this way, insight platform 230 may notify a user that an area is associated with a particular market index. Additionally, in this way, insight platform 230 may notify a user of particular information associated with an area and/or market index and may reduce a need of the user to cause user device 210 to perform a search for the information, thereby conserving processing and/or memory resources of user device 210.

Additionally, or alternatively, insight platform 230 may coordinate user devices 210 based on the market index. For example, insight platform 230 may coordinate user devices 210 (e.g., coordinate calendar applications associated with user devices 210 to schedule a meeting), and may provide information identifying a market index, data element scores, or the like (e.g., to be displayed in association with a calendar application or to be displayed at the meeting). In this way, a user may receive an indication that a meeting has been scheduled to discuss the market index, an area, and/or data elements scores. Additionally, in this way, insight platform 230 may reduce a quantity of processing needed to identify information associated with the entity, thereby conserving processor and/or memory resources of user device 210.

Additionally, or alternatively, insight platform 230 may cause a budget associated with an entity to be updated based on the market index. For example, insight platform 230 may identify a particular area in which the entity may operate (e.g., based on a market index), and may cause a budget to be updated to accommodate the particular area (e.g., may allocate resources towards operations associated with the area or may prevent resources from being allocated towards operations associated with the area or other areas).

Additionally, or alternatively, insight platform 230 may permit a user to access text and/or a resource associated with a data element. For example, insight platform 230 may provide information for display that identifies resources (e.g., documents, etc.) that include particular data elements. In some implementations, insight platform 230 may provide information that identifies a particular document associated with the market index and/or a data element (e.g., may provide a link, such as a hyperlink, to the document), may provide information that identifies a particular section of a document that includes a data element (e.g., may highlight, and present the section for display), or the like. In this way, insight platform 230 may assist a user in analyzing data elements associated with the entity and/or verifying the accuracy of a market index, or the like. Additionally, in this way, insight platform 230 may reduce a quantity of processing resources needed to perform a search for information identifying an attribute, thereby conserving processor and/or memory resources of user device 210.

Additionally, or alternatively, insight platform 230 may identify other entities associated with a particular area based on the market index. For example, insight platform 230 may provide information identifying other entities associated with the area. Additionally, or alternatively, insight platform 230 may identify information associated with the other entities. In some implementations, insight platform 230 may identify particular entities (e.g., target entities), associated with an area, that an entity may merge with and/or acquire. Additionally, or alternatively, insight platform 230 may identify information associated with the particular entities (e.g., as part of a due diligence process). Additionally, or alternatively, insight platform 230 may identify other entities (e.g., competitors) associated with an area, and may provide information associated with the other entities. In this way, a user may identify information associated with other entities that are associated with an area, and may perform an action based on the information.

In some implementations, insight platform 230 may cause an action to be performed in association with an area based on a market index, a data element score, an indicator value, a utilization value, and/or a competitiveness indicator value. For example, insight platform 230 may cause the entity to operate in association with the area (e.g., cause an item to be offered for sale, cause an item to be advertised, cause a license to be applied for, cause information to be disseminated to related entities, cause funding to be requested, cause another entity to be notified of the operation, cause supplies and/or materials to be ordered, cause personnel to be scheduled to perform an action, or the like), or may prevent the entity from operating in the area (e.g., may prevent the entity from continuing to operate in the area, or the like).

In some implementations, insight platform 230 may cause user devices 210 and/or another device to implement a campaign in association with a particular area based on a market index. For example, insight platform 230 may cause user device 210 to initiate a bid (e.g., a third party bid) for a more detailed marketing study in the area, cause user device 210 to initiate a trial in the area (e.g., a trial offering of a particular item), cause user device 210 to initiate a survey (e.g., a consumer survey, or the like), cause user device 210 to initiate a more detailed area study (e.g., an area study of demographics, of particular entities that are associated with the area, of particular entities that have left the particular area, or the like). In this way, insight platform 230 may cause user device 210 to perform a particular action in association with a particular area based on a market index, rather than imprudently cause user device 210 to perform other actions in associated with other areas (e.g., associated with lower market indices), thereby conserving processor and/or memory resources.

In some implementations, insight platform 230 may receive additional information based on providing a recommendation and/or causing an action to be performed. For example, assume that insight platform 230 causes an action to be performed in association with a particular area. In this case, insight platform 230 may receive additional information (e.g., revenue information, or the like), and may implement a machine learning technique to update one or more models (e.g., models that may be used to determine market indices, models that may be used to generate recommendation information, or the like). In this way, processor and/or memory resources of user devices 210 and/or insight platform 230 may be conserved by utilizing actual results to determine more accurate recommendations.

Implementations described herein enable insight platform 230 to receive, from multiple data sources, information associated with multiple data elements, determine data element scores based on the data elements, determine a market index based on the data element scores, and provide information that identifies the market index to permit and/or cause an action to be performed in association with the area. In this way, implementations described herein may enable insight platform 230 to cause an action to be performed based on a holistic view of an area (e.g., as compared to incomplete data) in a more efficient manner than as compared to user device 210 performing individual searches for information associated with the area, thereby conserving processor and/or memory of user devices 210 and/or conserving network resources. Additionally, implementations described herein may reduce a quantity of instances where an entity operates in a particular area that is associated with a particular market index (e.g., a low market index), thereby conserving processing and/or memory resources of computing devices associated with the entity operating in the particular area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable an insight platform to determine market indices based on data associated with disparate data sources and/or disparate areas. In this way, insight platform may more accurately determine a market index associated with an area in relation to when market indices are not determined based on data associated with disparate data sources and/or disparate areas.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
obtain text associated with one or more resources;
prepare the text for processing by standardizing the text into a particular format;
process the text;
identify first information that includes a first data element based on the processed text,
the first information being associated with a first area identifier;
identify second information that includes a second data element based on the processed text,
the second information being associated with a second area identifier,
the second area identifier being different than the first area identifier;
associate the first information and the second information with a geographic area based on the first area identifier and the second area identifier;
receive information that identifies data elements to be used to determine data element scores,
wherein the received data elements are selected via a user interface;
receive information that identifies weight values to assign the data elements,
wherein the received weight values are input via the user interface;
determine, for the geographic area, a first data element score, of the data element scores, based on the first data element, of the data elements;
determine, for the geographic area, a second data element score, of the data element scores, based on the second data element, of the data elements;
determine that at least one of the first data element score or the second data element score includes a value that satisfies a first threshold;
determine, for the geographic area, a market index based on the value satisfying the first threshold,
the market index being determined based on implementing a first machine learning model,
the first machine learning model being trained with known data element scores and a known market index as input;
provide information regarding the market index to cause an action to be performed in association with the geographic area,
the action comprises coordinating one or more calendar applications associated with one or more user devices to schedule a meeting;
provide an indication of the meeting scheduled to at least one calendar application, of the one or more calendar applications, associated with at least one user device, of the one or more user devices;
implement a second machine learning model based on information associated with the action; and
determine another market index, associated with another geographic area, based on implementing the second machine learning model.

2. The device of claim 1, where the one or more processors are further to:
apply a first weight value to the first data element;
apply a second weight value to the second data element,
the first weight value and the second weight value being different; and where the one or more processors, when determining the market index, are to:
  determine the market index based on the first weight value and the second weight value.
3. The device of claim 1, where the one or more processors are further to:
  compare the market index and the other market index; and
  where the one or more processors, when providing the information regarding the market index to permit and/or cause the action to be performed in association with the geographic area, are to:
    provide the information based on comparing the market index and the other market index.
4. The device of claim 1, where the first information is associated with a first data source, and the second information is associated with a second data source that is different than the first data source.
5. The device of claim 1, where the first information is associated with a first file format, and the second information is associated with a second file format that is different than the first file format.
6. The device of claim 1, where the one or more processors are further to:
  identify an amount of entities that are associated with the geographic area;
  determine that the amount satisfies a second threshold; and
  where the one or more processors, when providing the information regarding the market index to permit and/or cause the action to be performed in association with the geographic area, are to:
    provide the information based on the amount satisfying the second threshold.
7. The device of claim 1, where the one or more processors are further to:
  associate the geographic area with a third area identifier that is different than the first area identifier and the second area identifier;
  compare, based on the third area identifier, the market index and the other market index associated with another geographic area; and
  where the one or more processors, when providing the information regarding the market index to permit and/or cause the action to be performed in association with the geographic area, are to:
    provide the information based on comparing the market index and the other market index.
8. A method, comprising:
  obtaining, by a device, text associated with one or more resources;
  preparing, by the device, the text for processing by standardizing the text into a particular format;
  processing, by the device, the text;
  identifying, by the device, first information that is associated with a first area identifier based on the processed text;
  identifying, by the device, second information that is associated with a second area identifier based on the processed text,
    the first area identifier being different than the second area identifier;
  associating, by the device, the first information and the second information with a geographic area based on the first area identifier and the second area identifier;
  receiving, by the device, information that identifies data elements to be used to determine data element scores,
    wherein the received data elements are selected via a user interface;
  receiving, by the device, information that identifies weight values to assign the data elements,
    wherein the received weight values are input via the user interface;
  determining, by the device and for the geographic area, a set of data element scores, of the data element scores, based on the first information and the second information;
  determining, by the device, that a data element, of the data elements, includes a value that satisfies a first threshold;
  determining, by the device and for the geographic area, a market index based on the value satisfying the first threshold,
    the market index being determined based on implementing a first machine learning model,
      the first machine learning model being trained with known data element scores and a known market index as input;
  providing, by the device, information regarding the market index to cause an action to be performed in association with the geographic area,
    the action comprises coordinating one or more calendar applications associated with one or more user devices to schedule a meeting;
  providing, by the device, an indication of the meeting scheduled to at least one calendar application, of the one or more calendar applications, associated with at least one user device, of the one or more user devices;
  implementing, by the device, a second machine learning model based on information associated with the action; and
  determining, by the device, another market index, associated with another geographic area, based on implementing the second machine learning model.
9. The device of claim 1, wherein the data elements are based on area index insight associated with one or more healthcare plans and include two or more of:
  an enrolled value,
  an eligibility value,
  a potential eligibility value,
  a multi-eligibility value,
  an entity concentration value associated with a first entity,
  an entity concentration value associated with a second entity, or
  a product quality value.
10. The method of claim 8, further comprising:
  receiving information that identifies a set of data elements, of the data elements; and
  where determining the set of data element scores comprises:
    determining the set of data element scores based on the information that identifies the set of data elements.
11. The method of claim 8, further comprising:
  receiving information associated with an entity,
    the information associated with the entity identifying a set of first geographic areas,
    the entity being associated with the set of first geographic areas;
  determining market indices for a set of second geographic areas based on receiving the information associated with the entity,
    the entity not being associated with the set of second geographic areas, the geographic area being included in the set of second geographic areas; and where providing the information regarding the market index comprises:

providing information regarding the market indices, the market indices including the market index.

12. The method of claim 8, further comprising:

identifying a number of other entities associated with the geographic area;

determining that the number satisfies a second threshold; and where providing the information regarding the market index comprises:

providing the information based on the number satisfying the second threshold.

13. The method of claim 8, further comprising:

determining a set of market indices, the set of market indices including the market index;

generating a heat map that identifies the set of market indices and that covers a plurality of geographic areas; and where providing the information regarding the market index comprises:

providing the heat map.

14. The method of claim 8, where the first information is associated with a first data source, and the second information is associated with a second data source that is different than the first data source.

15. A non-transitory computer-readable medium storing instructions, the instructions comprising:

one or more instructions that, when executed by one or more processors, cause the one or more processors to:

obtain text associated with one or more resources;

prepare the text for processing by standardizing the text into a particular format;

process the text;

identify information associated with a geographic area based on the processed text, the information including a first data element and a second data element;

identify information associated with an entity based on the processed text;

receive information that identifies data elements to be used to determine data element scores, wherein the received data elements are selected via a user interface;

receive information that identifies weight values to assign the data elements, wherein the received weight values are input via the user interface;

determine, based on the information associated with the entity, a first data element score, of the data element scores, associated with the first data element, of the data elements;

determine, based on the information associated with the entity, a second data element score, of the data element scores, associated with the second data element, of the data elements;

apply a first weight value to the first data element score;

apply a second weight value to the second data element score;

determine that at least one of the weighted first data element score or the weighted second data element score includes a value that satisfies a threshold;

determine a market index, for the geographic area, based on the value satisfying the threshold, the market index being determined based on implementing a first machine learning model, the first machine learning model being trained with known data element scores and a known market index as input;

provide information regarding the market index to cause an action to be performed in relation to the geographic area, the action comprises coordinating one or more calendar applications associated with one or more user devices to schedule a meeting;

provide an indication of the meeting scheduled to at least one calendar application, of the one or more calendar applications, associated with at least one user device, of the one or more user devices;

implement a second machine learning model based on information associated with the action; and determine another market index, associated with another geographic area, based on implementing the second machine learning model.

16. The non-transitory computer-readable medium of claim 15, where the one or more instructions, when executed by the one or more processors, further cause the one or more processors to:

identify a set of data elements, of the data elements, associated with the geographic area based on the information associated with the geographic area;

determine, based on the information associated with the entity, a subset of the set of data elements, the subset of the set of data elements including the first data element and the second data element; and where the one or more instructions, that cause the one or more processors to determine the first data element score and the second data element score, cause the one or more processors to:

determine the first data element score and the second data element score based on the subset of the set of data elements.

17. The non-transitory computer-readable medium of claim 15, where the one or more instructions, when executed by the one or more processors, further cause the one or more processors to:

cause a message to be provided to a set of user devices based on the market index; and where the one or more instructions, that cause the one or more processors to provide the information regarding the market index to permit and/or cause the action to be performed, cause the one or more processors to:

provide the information regarding the market index to cause the message to be provided.

18. The non-transitory computer-readable medium of claim 15, where the geographic area is a first geographic area;

where the one or more instructions, when executed by the one or more processors, further cause the one or more processors to:

receive information that identifies the other market index; and where the one or more instructions, that cause the one or more processors to determine the market index, cause the one or more processors to:

determine the market index based on the information that identifies the other market index.

19. The non-transitory computer-readable medium of claim 15, where the one or more instructions, when executed by the one or more processors, further cause the one or more processors to:

receive other information associated with the geographic area,
> the other information including a first type of area identifier,
> the information associated with the geographic area including a second type of area identifier; and where the one or more instructions, that cause the one or more processors to determine the market index, cause the one or more processors to:
> determine the market index based on the information associated with the geographic area and the other information associated with the geographic area.

20. The non-transitory computer-readable medium of claim 15, where the one or more instructions, when executed by the one or more processors, further cause the one or more processors to:

compare the market index and the other market index; and
where the one or more instructions, that cause the one or more processors to provide the information regarding the market index, cause the one or more processors to:
> provide the information regarding the market index based on comparing the market index and the other market index.

\* \* \* \* \*